(12) United States Patent
Pleva et al.

(10) Patent No.: US 6,538,252 B1
(45) Date of Patent: Mar. 25, 2003

(54) METHOD AND DEVICE FOR DETERMINING THE ALIGNMENT OF LINE FORMATIONS IN AREAL, ESPECIALLY LONGITUDINALLY MOVED, WEBS OF A STRUCTURAL FORMED BODY

(75) Inventors: Ralf Pleva, Horb (DE); Harry Pleva, Horb (DE)

(73) Assignee: PLEVA GmbH, Empfingen (DE)

( * ) Notice: Subject to any disclaimer, the term of this patent is extended or adjusted under 35 U.S.C. 154(b) by 0 days.

(21) Appl. No.: 09/557,512

(22) Filed: Apr. 25, 2000

(30) Foreign Application Priority Data

Nov. 4, 1999 (DE) ............................... 199 53 130
Apr. 30, 1999 (DE) ............................... 199 19 668

(51) Int. Cl.$^7$ ............................................. G01N 21/89
(52) U.S. Cl. ................. 250/360.1; 250/359.1; 250/559.04; 250/559.05; 250/559.3; 250/559.37; 250/559.48; 356/238.2; 26/51.5
(58) Field of Search ................ 250/360.1, 359.1, 250/202, 548, 559.04, 559.05, 559.06, 559.07, 559.08, 559.3, 559.37, 559.48; 356/139.05, 139.06, 139.08, 238.1, 238.2; 26/51.5

(56) References Cited

U.S. PATENT DOCUMENTS

| 2,196,893 A | * | 4/1940 | Berry ..................... 242/534.1 |
| 3,077,656 A | * | 2/1963 | Mahlo ........................ 26/51.5 |
| 4,255,050 A | * | 3/1981 | Beckstein et al. ..... 250/559.37 |
| 4,338,588 A | * | 7/1982 | Chevillat et al. ........... 250/557 |
| 4,414,476 A | * | 11/1983 | Maddox et al. ............. 250/235 |
| 4,656,360 A | * | 4/1987 | Maddox et al. ........ 250/559.37 |
| 5,646,414 A | * | 7/1997 | Lyczek .................. 250/559.37 |
| 5,696,591 A | * | 12/1997 | Bilhorn et al. ......... 250/559.03 |
| 2002/0015152 A1 | * | 2/2002 | Biazzi ........................ 356/429 |

FOREIGN PATENT DOCUMENTS

| DE | 1 635 266 | 3/1972 |
| DE | 28 50 804 C2 | 8/1983 |
| DE | 37 17 305 C1 | 7/1988 |
| DE | 36 33 439 C2 | 2/1989 |
| EP | 0 741 290 A1 | 11/1996 |
| JP | 6-20151 | * 1/1994 ........... C21D/11/00 |

* cited by examiner

Primary Examiner—Constantine Hannaher
Assistant Examiner—Albert Gagliardi
(74) Attorney, Agent, or Firm—Gudrun E. Huckett

(57) ABSTRACT

In a method for determining alignment of line formations of a web, a radiation source emitting radiation and a detector with numerous radiation sensors for sensing the radiation are provided. The radiation source and the detector are reciprocated together simultaneously transversely across the web. During reciprocation across the web, at least one measuring location of the web is irradiated by the radiation source and measured values, based on local radiation intensities are measured by the radiation sensors of the detector. The measured values are communicated to a computer. The computer generates, based on the measured values and the relative positions of the radiation sensors to one another, a local structural image of the at least one measuring location of the web.

8 Claims, 4 Drawing Sheets

METHOD AND DEVICE FOR DETERMINING THE ALIGNMENT OF LINE FORMATIONS IN AREAL, ESPECIALLY LONGITUDINALLY MOVED, WEBS OF A STRUCTURAL FORMED BODY

BACKGROUND OF THE INVENTION

1. Field of the Invention

The invention relates to a method and a device for determining the alignment of line formations of areal, in particular, longitudinally moved webs of a structural formed body. In the method for determining the alignment of line formations in areal webs of a structural formed body such as textiles, fleece, paper, braided wire or plastic material etc., a detector views a surface portion of the structural formed body, which is illuminated by a radiation source, by means of a plurality of radiation-sensitive sensors and a computer determines based on the respectively measured local radiation intensities measured by the sensors, with consideration of the position of the sensors relative to one another, the line formations and their alignment in the structural formed body. The device for determining the alignment of line formations of areal, web-shaped structural formed bodies such as textiles, fleece, paper, braided wire or plastic material etc., has a radiation source which directs radiation onto the surface of the structural formed body and a detector which faces the irradiated surface portion and has a plurality of radiation-sensitive sensors arranged in fixed spacing to one another. A computer for processing/evaluating the measured values of the sensor is connected in a signal-transmitting manner to the detector.

2. Description of the Related Art

The alignment of line formations of areal webs of a structural formed body can deviate from the ideal image upon manufacture of the structural webs. For quality assurance, information of the actual alignment of the line formations as precisely as possible is required in order to be able to correct, for example, in subsequent machining steps, possibly occurring deviations from the ideal image, for example, warpage within the textile web.

From German patent document DE 1 635 266 a method for measuring the weft yarn position of moving textile webs by a light source directed onto the textile web and a measuring device, which comprises at least one photoelectric cell affected by the light source, are known. The electrical voltage emitted by the photoelectric cell serves as a signal. The known method provides for an automatic following of the respective position of the weft yarn by the measuring device until an extreme of the signal(s) emitted by the photoelectric cell(s) results. For determining the angular deviation of the weft yarn, the deviation of the measuring device position resulting in the extreme signal value from the normal position is measured. In this measuring principle, a suitable optical device detects a linear surface element of an illuminated textile surface by a photoelectric cell, but only locally in a measuring area detectable by the optical device. In order to obtain information in regard to the alignment of the line formations across the entire web width, several such measuring devices must be arranged adjacent to one another.

In order to be able to detect the entire width of the textile length and to keep the constructive expenditure as low as possible, the German patent document 28 50 804 C2 suggests to arrange on the left and the right half of the web surface one or more sensor heads, respectively, and to move them symmetrically to the web center in opposite directions wherein the sensing signals of both halves are to be correlated with one another. The evaluation/processing of the measuring signals, which are obtained by a slot-wise viewing of the surface by optical lens systems, requires however a longer period of time. Especially with quickly moving webs and quickly and greatly changing warpage the measurements across the web width relative to one another can no longer be correlated with one another.

The German patent document 36 33 439 C2 discloses a detector arrangement with aperture slot, optical lens systems and photoelectric cells which are rotated back and forth by a step motor. In an alternative to the rotatable arrangement of the components a stationary detector arrangement with a plurality of light-sensitive sensors is suggested wherein the use of a CCD camera (charged coupled device) is suggested. In this CCD camera the light-sensitive sensors are arranged in a stationary row. A computer performs a virtual rotation of the optical system, instead of the mechanical rotation performed by the step motor, by means of evaluating individual points of the linear area of the textile with the CCD row.

In German patent document 37 17 305 C1 it is suggested to view a slot-shaped portion of the web for measuring the weft yarn or stitch row position (warpage angle) in continuously conveyed textile webs by transillumination or surface illumination methods, wherein by means of the CCD rows the brightness values within the slot-shaped portion are divided into two brightness steps (light, dark). From these digital brightness values of the CCD sensors within the measured slot-shaped portion those sections are determined within which the brightness values can be continuously coordinated with a brightness step in order to thus determine the warpage angle of the weft. The slot-shaped portion is positioned at a fixed angle to the conveying direction of the textile web. Despite the use of two CCD rows as photo sensors, the known device cannot provide a satisfactory precision in the determination of the alignment and the detection of warpage, especially for structural formed bodies with complex line formations such as tightly woven textiles.

European patent document 0 741 290 A2 discloses a method for detecting the warpage angle of continuously moving textile webs wherein the measurement across the entire width is supposedly made possible with CCD sensors in that by means of a single stationery image-producing device a real image across the width of the web is detected. The sampled image of the CCD measuring signals is saved in the form of rectangular subsections. A computer evaluates/processes the saved data with transformation algorithms, and this supposedly allows a characterization of the yarn directions across the entire textile web with. The known method can determine yarn warpage only unsatisfactorily for complex textiles even when using powerful computers.

SUMMARY OF THE INVENTION

It is an object of the present invention to provided a technically new method of the aforementioned kind and a new device in order to provide with minimal constructive expenditure a precise and fast determination of the alignment of line formations in web-shaped structural formed bodies.

In accordance with the method of the present invention, this is achieved in that the radiation source and the detector are arranged so that they can be reciprocated together and synchronously across the width of the structural formed body wherein at least at one transverse position above the areal structural formed body the local structural image is detected. The device according to the invention is characterized in that the radiation source and the detector are arranged so that they can be reciprocated together and synchronously across the width of the structural formed body.

According to the invention, it is suggested that the radiation source irradiating the structural formed body and the detector comprising a plurality of radiation-sensitive sensors are reciprocated together and synchronously across the width of the structural formed body for determining the alignment of line formations. When doing so, the local structural image of the formed body is detected at least at one transverse position above the areal web by short-time measurement within a microsecond range. It is possible to take local momentary images of the web surface at any desired predetermined transverse position without interrupting the transverse movement. The alignment of the local line formation in the viewed surface area portion is determined by the computer as a function of the local radiation intensity measured by the individual sensors. A line structure can be deduced, for example, from similar measured values of neighboring sensors. Expediently, the sensors are arranged in a matrix within a plane wherein any kind of line formation can be detected in the matrix plane. The detector and the radiation source can be arranged on the same side of the structural web wherein the sensors detect the reflected radiation of the irradiated surface. An arrangement of the detector and the radiation source on opposite sides of the structural areal web is especially advantageous wherein the structural formed body is penetrated by the radiation. For the determination of the alignment of the line formations, the web to be examined is transported between the detector and the radiation source.

The determination of the alignment of the line formations is carried out with the inventive measures independent of the transport speed of the examined structural web and can be carried out even when the structural formed body is stationary.

In a preferred embodiment of the invention an areal photo transducer with photo sensors arranged in a matrix, such as a CCD matrix, is used as a detector and a light source is used as a radiation source which emits light in the visible, infrared or ultraviolet wave range. In the alternative, it is suggested to carry out an x-ray irradiation of the structural formed body and to view the irradiated surface portion with a corresponding detector having a sensor matrix that is sensitive to x-ray radiation. This method is advantageous in particular when viewing and monitoring materials impermeable to light.

By taking into account the traversing speed of the detector and the radiation source, the computer correlates advantageously the transverse positions of the detector and the radiation source at each measuring location with the respective structural image that has been determined by the measured information. By being able to measure without stopping, it is thus possible to perform a measurement at high traversing speed and high transport speed of the areal web at any desired transverse position in order to achieve a gap-free structural image across the entire width of the areal web with high evaluation speed. Expediently, for one traversing path across the web, multiple measurements are performed at, if needed, predetermined transverse positions wherein deviations from the ideal image of the line formation are easily detected. Upon return movement of the detector, measurements at transverse positions are performed which are located between the measuring locations of the initial movement across the web.

In comparison to the prior art, a higher precision can be achieved and, moreover, any selected transverse position across the web can be measured because of the synchronous movement of the radiation source and the detector in the transverse direction of the web-shaped structural formed body. The measurements are carried out essentially independently of the movement velocity of the web, and the constructive expenditure is reduced by using a single detector. For great web widths it is however possible to use two or more detectors with corresponding radiation sources, for example, illumination sources, so that in this manner the measuring times can be shortened.

Moreover, from the structural image according to the measured signals of the radiation-sensitive sensors, especially when they are arranged in a matrix, information in regard to the line density of the structural formed body can be deduced as well as characteristic data of the structure.

When using a CCD camera for determining the alignment of the line formation, an adjustable flash is preferably used as a light source which can be adjusted with respect to intensity and illumination time. It moves with the detector in the traversing direction. The short illumination times in a microsecond range, which are sufficient for producing the local structural image, can however also be achieved by permanent light sources by using the shutter of the camera for varying the illumination times.

The radiation source and the detector can be secured on a traversing guide in a slidable manner and are guided by a suitable step drive together and simultaneously along the traversing guide. The traversing guide can be formed by rails on a measuring frame. In an arrangement of the radiation source and of the detector on opposite sides of the structural formed body two parallel rails are provided on which the radiation source and the detector are guided by means of a respective carriage. The structural formed body to be examined is guided between the rails.

The step drive for the carriages of the radiation source and the detector is controlled by the computer wherein the traversing speed and the frequency of structural image taken across the web can be adjusted according to the type of structural formed body to be examined or also according to other parameters. For example, when detecting warpage relative to a nominal alignment of the line formations the traversing speed can be changed by the computer in order to be able to obtain information in regard to the structural image more quickly by simultaneously adapting the measurements per traversing stroke. In particular, upon detecting deviations in the predetermined structural alignment, the traversing stroke or path can be shortened and the number of measurements performed during the traversing movement can be reduced. An adjustable device for limiting the traversing movement can, for example, detect the edge of the structural formed body or can be arranged at a suitable transverse position in order to send a signal for reversing the traversing movement to the computer. Also, by arranging such limitation devices, such as, for example, mirrors in the case of optical CCD systems, the correlation of the measurements and of the detected structural images of respective surface portions can be synchronized with the transverse position.

DESCRIPTION OF THE PREFERRED EMBODIMENTS

Figure 1:
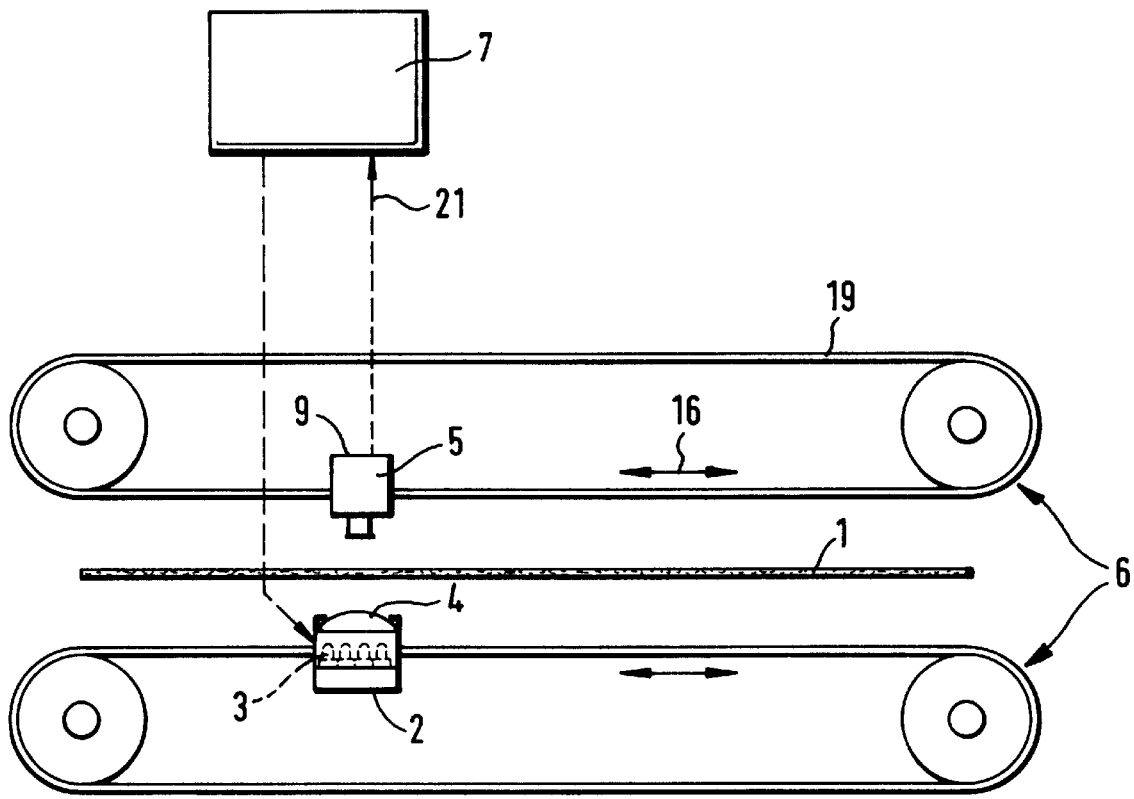
FIG. 1 is a schematic representation of a device for detecting the line formations of a structural web.

FIG. 1 shows a schematic view of the device according to the invention for determining the alignment of line formations in webs of structural formed bodies which in the present case is a textile web 1. The textile web 1 is moved perpendicularly to the plane of the drawing in the longitudinal direction wherein especially warpage of the orthogonal structures of the warp and weft yarns of textiles or, in knit materials, of the stitches, are determined. In a similar manner it is also possible to monitor the alignment of the line formation of other areal structural formed bodies such as fleece, paper, braided wire or plastic materials. The knowledge of the local warpage of the yarn structures in the textile web 1 is a prerequisite that makes it possible to correct the yarn formations with respect to the occurring warpage angle and to match the textile structure to the nominal image in the following machining step of the textile web 1.

For detecting the yarn alignment in the textile web 1 a detector 5 is provided which views the surface area of the textile web 1, illuminated by the radiation source 2, by means of a plurality of radiation-sensitive sensors. The detector 5 and the radiation source 2 are arranged on opposite sides of the textile web 1 wherein the textile web 1 is penetrated by radiation. The radiation source can alternatively also be arranged at the same side of the textile web 1 as the detector so that it receives reflected radiation. The sensors of the detector 5 produce, as a function of the respectively measured values of the radiation intensity of the radiation affected by the yarn structure of the textile web, an output signal which is evaluated/processed by the computer 7. In the shown preferred configuration of the invention, the alignment of the yarn structure is optically detected wherein a light source 2 is the radiation source and a CCD camera 5 is used as the detector. The CCD camera 5 is a large surface area photo transducer which comprises a plurality of individual photo sensors arranged in a matrix. The sensor matrix 9 delivers a pixel signal 21 comprised of the greyscale value information of the individual sensors which is input into the computer 7. In an alternative to the arrangement of the light source 2 and the CCD camera 5 positioned on opposite sides of the textile web 1 with penetration of the web structure 1 by radiation, the light source 2 and the detector 5 can be arranged on the same side of the textile web 1. In this configuration, the CCD camera detects the light radiation reflected by the viewed areal portion. Instead of the optically operating CCD camera a detector and a corresponding radiation source can be used which operate with radiation other than light, for example, x-ray radiation. This makes it possible to penetrate the web by radiation and view in particular coated webs so that a corresponding pixel image is produced by the sensor matrix 9.

The CCD camera 5 and the light source 2 are reciprocated together and synchronously in the direction of arrow 16 across the width of the textile web wherein at predetermined transverse position above the textile web local structural images are detected. The CCD camera 5 and the light source 2 are received on a traversing frame 6 and are driven to traverse the width of textile web 1 with respective identical spacing to one another on opposite sides of the textile web 1. The step drive, not shown, is controlled by the computer 7. The step drive acts by means of a toothed belt 19 or a cable pull on the CCD camera 5 and the light source 2 wherein the toothed belt pulls respectively in the desired traversing direction 16.

Figure 2:
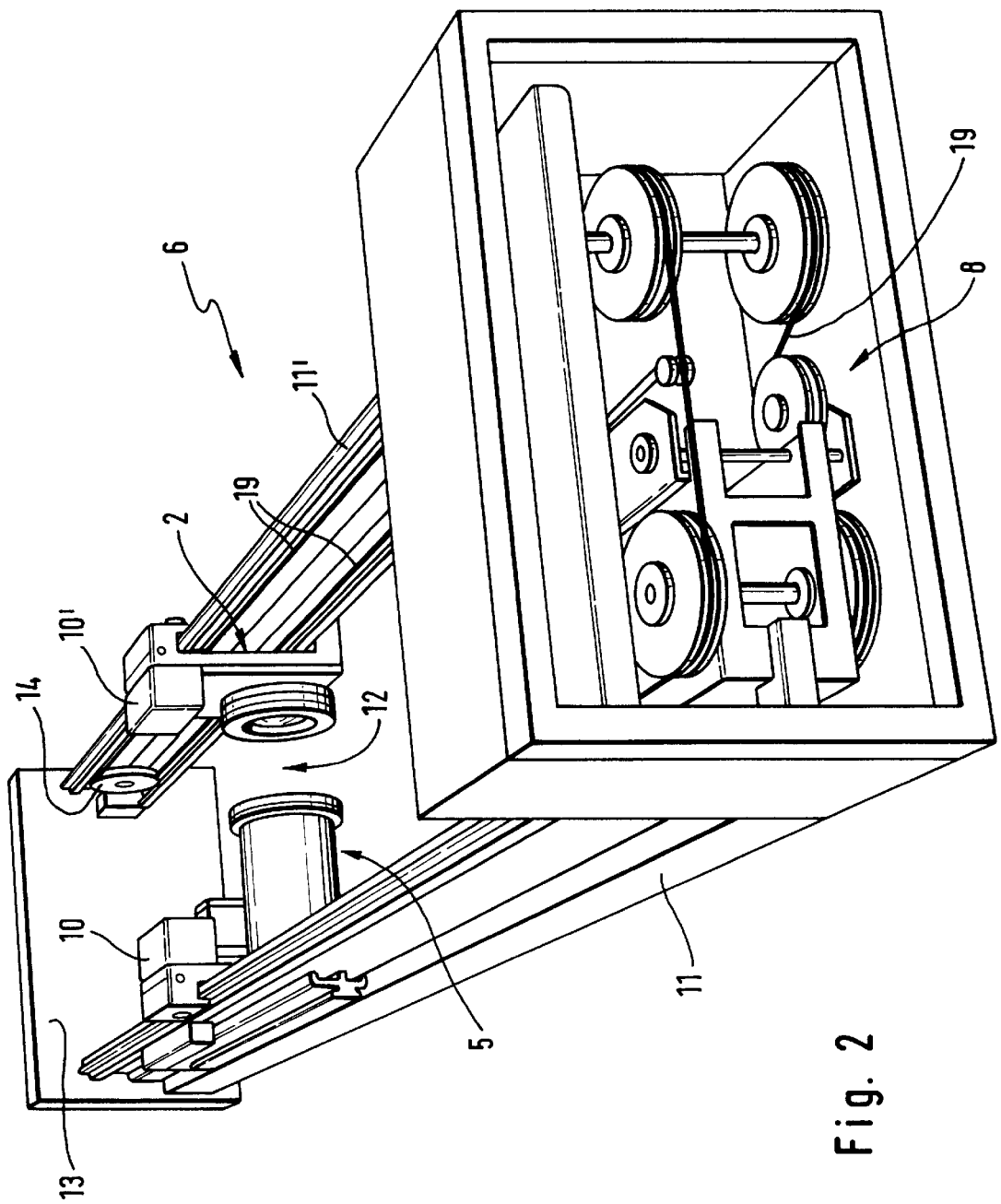
FIG. 2 is a perspective view of a measuring frame with traversing measuring device.

FIG. 2 shows a perspective representation of the measuring frame 6 which comprises a traversing guide for the light source 2 and the CCD camera 5. Two parallel rails 11, 11' are provided whose ends are fastened to the end face 13. On the rails 11, 11' carriages 10, 10' are guided. One carriage 10' supports the light source 2 and the other carriage 10 supports the CCD camera 5. The textile web to be examined passes through the gap 12 between the light source 2 and the CCD camera 5. The synchronous drive of the carriages 10, 10' is realized by the toothed belt which is guided in the drive unit 8 at one end of the rails 11, 11' as well as about respective guide pulleys at the other end of the rails 11, 11'. The light source 2 and the CCD camera 5 are moved respectively in the same direction when the cable pull is driven in the corresponding pulling direction by the step drive 8.

The computer 7 adjusts the traversing speed of the CCD camera 5 and correlates, while taking into account the traversing speed, the transverse position at each measuring location of the web to the respective structural image of the yarn formation derived from the pixel signal of the sensor matrix 9. The light source 2 is preferably spaced approximately 60 mm from the textile web 1 and comprises a plurality of light emitting infrared diodes 3. Advantageously, approximately 100 diodes 3 can be arranged on a surface of approximately 50 mm by 50 mm. The CCD camera 5 is arranged on the opposite side of the textile web at the same spacing to the textile web 1 as the light source. In the shown embodiment, in front of the light source 2 a convergent lens 4 is provided which focuses the light emission of the infrared diodes 3 onto the surface portion (measuring location) of the textile web 1 to be examined.

The CCD camera 5 comprises a lens which forms a sharp image of the surface portion on the sensor matrix 9 of the camera 5. Expediently, the CCD camera for sensing illuminated surface portions is provided with a zoom lens which can be adjusted according to the structure of the respective surface portion to be examined. The adjustment of the zoom lens can be carried out manually or by a motor, optionally automatically according to the fineness of the structure to be examined. Depending on the yarn density of the different textiles, an optimal resolution on the sensor matrix 9 can be easily realized. A zoom lens that can be adjusted by a motor is advantageously embodied such that the best possible image sharpness can be adjusted continuously and automatically (auto-focus). The adjusted focal length of the zoom lens and the corresponding image sharpness are input into the computer to be taken into account for determining the alignment of the line formations. The focal length and the corresponding image scale of the structure web is included in the computational evaluation/processing of the pixel signals of the detector. The continuous determination of the image scale ensures the precise detection of line formations. This is especially important for continuous measurement of the moving webs and compensates irregularities in the transport of the structural web. The values of the lens adjustment, for the purpose of including these values for determining the line density, can be recorded or detected by means of an acknowledgment transducer, for example, a potentiometer, wherein the present adjustment of the potentiometer relative to a basic or calibrated position is automatically taking into account for the computation.

The light source 2 with its infrared diodes 3 is switched by the computer 7 as a flash and illuminates the textile when passing through in the microsecond range wherein even at high transport velocities of the textile web of, for example, 200 meters per minute, the local yarn alignment can be precisely determined. For paper webs with 10 times higher speed of up to 2000 meters per minute, the illumination time must be shorter by a factor 10. The required illumination, depending on the transparency of the object to be measured, is realized by electronic output control of the flash and alternatively or additionally also by the aperture control of the CCD camera. Instead of such a flash system with infrared diodes, it is also possible to employ permanent light sources wherein the illumination time can be controlled by the shutter of the camera. Such a shutter device avoids moreover the influence of external light during measurement and improves thus the evaluation result of the structural image scanned by the CCD camera. When using correspondingly sensitive sensors it is also possible to employ a permanent light source operated with DC (direct current), for example, a fluorescent lamp extending across the width of the web. Shielding with regard to surrounding radiation is generally not required in this context.

During a traversing movement multiple measurements at predetermined transverse positions are performed wherein the computer correlates the respective pixel signals 21 of the CCD camera 5 and the scanned local structural image of a respective measuring location of the web to build a structural image across the width of the web. The measurements can be performed at any desired position across the width of the web and this results in a high measuring precision. With a single light source and a CCD camera 5 it is thus possible to diagnose, with a minimal constructive expenditure and independent of the movement state of the textile web 1, the yarn alignment across the entire web width. It is also possible to determine additional information from the scanned structural image, for example, the yarn density and optionally also flaws in the structure. The measurements can be carried out with short illumination times during the traversing movement in order to thus have a quick overview along the entire width of the web, even for web widths of approximately 2.5 m. During a traversing movement measurements can be performed, for example, at eight predetermined transverse positions. For improving the structural detection across the entire web width, it is suggested to perform during the return movement of the detector measurements in the intermediate spaces between the measuring locations of the initial transverse movement. The evaluation/processing of the measured signals by the computer 7 is carried out between the respective measurements with illumination times of preferably 10 or fewer microseconds.

Figure 3:
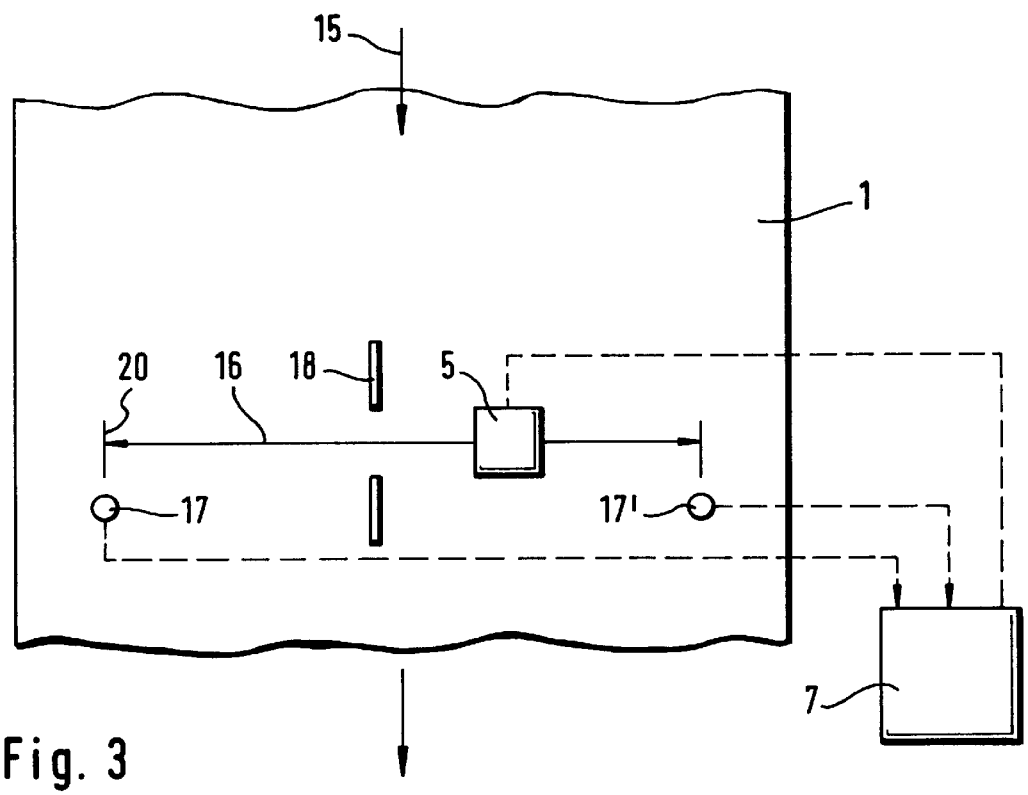
FIG. 3 is a schematic representation of a plan view onto the traversing measuring device.

For a precise determination of the transverse coordinates during the traversing movement, the step drive of the carriages for the CCD camera 5 and the light source 2 must be synchronized with the transverse position in order to provide the computer with precise data for the evaluation. As symbolically represented in FIG. 3, the movement of the detector 5 (CCD camera) can be monitored by photoelectric barriers 17, 17' whose signals can be input into the computer 7. The photoelectric barriers can be arranged such that the lateral edges of the textile web 1 moving in the direction of arrow 15 through the traversing measuring device (2, 5) can also be detected. The length of the traversing stroke is adjusted by the computer unit 7 and can be varied according to the warpage or deviations of the desired image of the textile web 1 to provide faster measurements, if needed, in order to achieve a faster information-processing. When the traversing detector reaches the provided limits 20 of the traversing movement 16, synchronization of the image processing and correlation of the transverse position across the textile web 1 takes place simultaneously with the switching of the movement reversal. For synchronizing the transverse position of the detector with the respectively recorded structural image at these transverse positions, a mirror 18 or another suitable optical device can be arranged substantially at the center of the measuring frame or of the traversing movement. Moreover, it is possible to arrange two mirrors on either side of the center of the traversing movement and to determine, based on the time it takes the traversing detector to move along the path from one mirror to the other, the traversing speed and the transverse position and to use these values for determining preset values of location and point in time for the directional reversal at the end of the desired traversing path.

The traversing movement is carried out preferably across the entire width of the textile web 1 wherein the computer, upon determination of deviations of the detected yarn alignment from the ideal orientation, shortens the traversing path and reduces the number of measurements for each traversing movement. In this manner, information in regard to occurrence of further changes of the yarn alignment can be obtained faster. As soon as the computer determines that the warpage within the textile web 1 changes suddenly, the detector with the CCD camera is operated with greatest possible traversing speed across a limited traversing path, for example, two-thirds of the web width. This detects the changing warpage without delay. With slower traversing speed a finer width resolution can be obtained when less warpage is present.

Figure 2A:
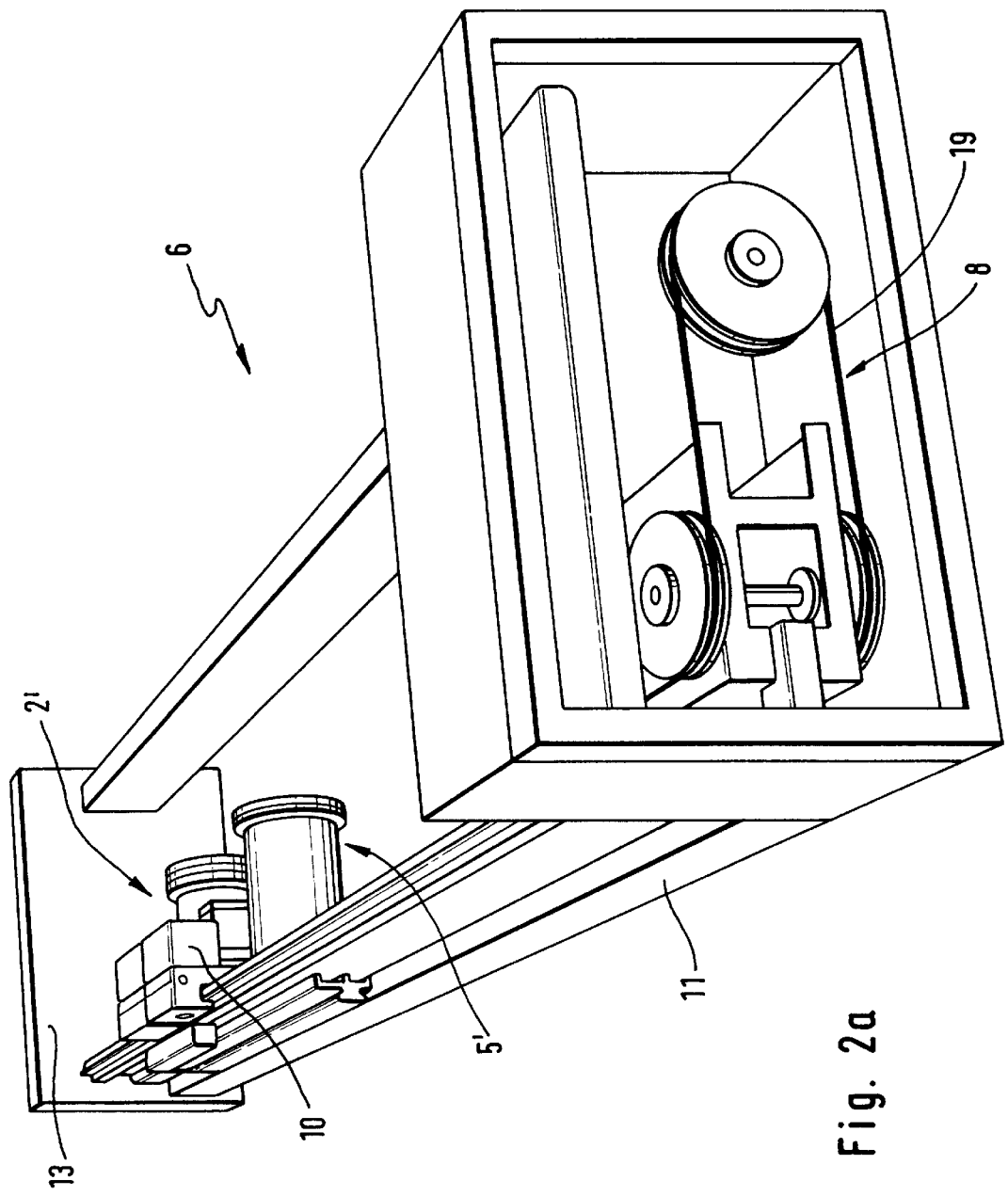
FIG. 2a is a perspective view of a traversing measuring device with detector and radiation source positioned on the same side of the web.

FIG. 2a shows a measuring device which in contrast to the arrangement represented in FIG. 2 has a radiation source 2' and a CCD camera 5' arranged on the same side of the structural web to be observed. The radiation source 2' and the CCD camera 5' are supported on a common carriage 10 which is guided in the same way as disclosed with respect to FIG. 2 on a rail 11 of the measuring frame 6. The detector 5' receives the radiation reflected on the structural web. The embodiment of the detector as a CCD camera 5' and of the radiation source 2' corresponds substantially to the description provided for FIG. 2. Expediently, for a measuring device according to FIG. 2, in which the radiation source is arranged on a separate carriage opposite the detector, a further light source may be provided on the carriage of the detector. With such an arrangement it is possible to examine for the purpose of determining the alignment of the line formations structural webs that can be penetrated by radiation as well as structural webs that cannot be penetrated. The detector then selectively cooperates with the oppositely arranged radiation source or with the source on the same carriage. The radiation source coordinated with the detector 5' can advantageously be mounted on a ring surrounding the CCD camera 5'.

For evaluating the measuring signals of the sensor matrix in the CCD camera, a structural image is determined based on the indicated greyscale values of the individual sensors of the sensor matrix wherein corresponding greyscale values of neighboring sensors indicate the line formation. Based on a structural image of preferably 500 by 500 pixels, already minimal deviations of the line formation relative to the nominal alignment can be detected. In the case of textiles with orthogonal yarn structures, a virtual reference grid of parallel straight lines is projected onto the measured values of the sensor matrix according to the pixel signal and the measured values (greyscale values) are added up along each straight line. Subsequently, the virtual reference grid is rotated by predetermined angle steps relative to the measured value matrix for further summation processes of the measured values along the straight lines, wherein a determination of the extremes of the measured value sums of the straight lines is performed. In the case of textiles with orthogonal yarn structure primarily the orientation of the weft yarns is of interest which extend transverse to the longitudinal web direction. Based on the desired and not realized alignment, a rotation of the virtual reference grid by the expected possible angular range of the warpage angle relative to the nominal alignment is performed. Preferably, the evaluation of the sensor matrix is carried out with approximately 200 parallel straight lines for a warpage angle range of approximately +/–15° wherein rotation steps of approximately 0.5° are expedient. The step parameters can be determined as a function of the respectively examined textile type with the expected yarn density. In this manner, the algorithm for evaluating the pixel signal of the CCD camera can be adjusted by suitable parameters to the special evaluation requirements according to the respective textile type to be examined, so that the required computing power for information processing is reduced. In measuring ranges of minimal deviation from the nominal alignment, measurements in small angular steps between 0.1° and 1.5° are performed. In the case of greater warpage, depending on the type and fineness of the structure, the measurements are carried out at greater step intervals of between 0.5° and 3° up to the maximum expected angular deviation which is 15° in the warpage angle range of the present embodiment. The computational expenditure can be further reduced when for the evaluation/processing the number of pixels of the sensor matrix to be processed is limited with regard to rows and columns of the matrix. For example, only every second, third, or fourth pixel point can be processed or, for example, only every second, third or fourth row or column of the matrix.

When line structures that are straight are present in the structural formed body to be examined, which is generally the case for textile webs, the greyscale value sums along individual ones of the virtual straight lines have extremes when their direction and the alignment of the actual line structures of the textile web coincide. The processing of these extremes, especially the differences between the individual straight lines of each examined orientation in the angular range about the nominal alignment of 0° allows the reliable detection of distinct line formations.

Figure 4:
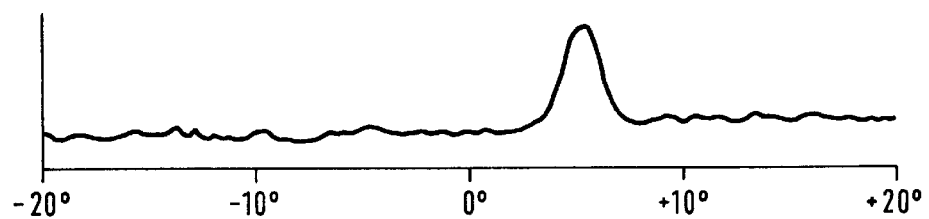
FIG. 4 is a graphic representation of the differences of the greyscale value sums of CCD sensors across the angle area of +/−20°.

FIG. 4 shows in a graphic representation the maximum differences of greyscale value sums across an angle range of +/–20°. The extreme value which characterizes the yarn direction is approximately +5° relative to the exact zero line.

Figure 5:
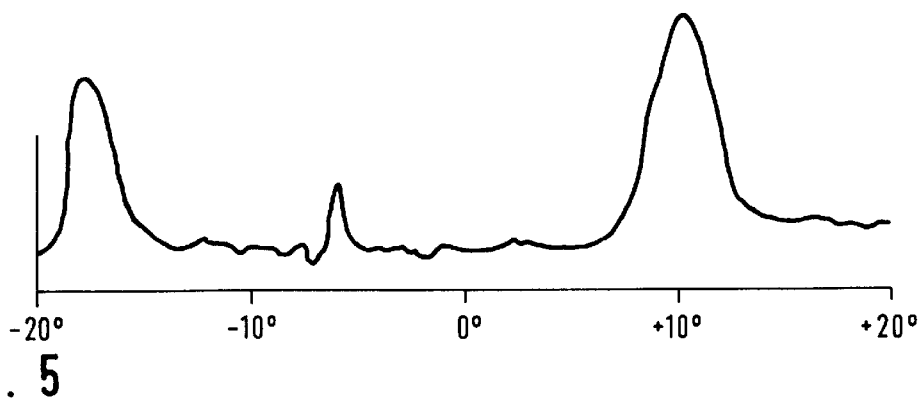
FIG. 5 is a graphic representation of the differences of the greyscale value sums of the CCD sensors for a different structural formed body than that in FIG. 4.

FIG. 5 shows the evaluation of the greyscale value sums in angle ranges of –20° to +20° for a textile web in which further structures are imprinted and are therefore detected by the CCD camera. These additional line structures can dominate in some products over the weft yarn alignment that is to be determined. In order to select the yarn pattern in such a directional pattern, it is suggested to evaluate the geometric spacing of the determined structural lines. Furthermore, the values of the differences between the measured value sums are taking into account for processing. In the shown evaluation multiple extremes are present at –18°, –6° and approximately +10°. They differ in their intensity, i.e., in their absolute values. When taking into consideration the geometric spacing of the virtual lines with maximum and minimum greyscale values, for the less pronounced maximum at –6° it is determined that here the spacing coincides with the yarn spacing of the fabric that is examined. The two other maxima correspond to more coarse fabric structures and thus need not be considered in the determination of the weft yarn alignment.

Based on the recognition that for certain web structures which have multiple uniform straight structural formations, in the warped state all angles at the points of intersection of the linear structures are changed substantially by the same amount, the angle deviation is determined by comparison of the determined alignment pattern with the nominal alignment, for example, by a cross correlation calculation.

While specific embodiments of the invention have been shown and described in detail to illustrate the inventive principles, it will be understood that the invention may be embodied otherwise without departing from such principles.

What is claimed is:

1. A method for determining alignment of line formations of a web, said method comprising the steps of:

providing a radiation source emitting radiation and a detector with numerous radiation sensors for sensing the radiation;

reciprocating the radiation source and the detector together simultaneously transversely across a web;

during the step of reciprocating, irradiating at least one measuring location of the web by the radiation source and measuring by short-time measurements within a microsecond range measured values, based on local radiation intensities of the at least one measuring location of the web, by the radiation sensors of the detector;

communicating the measured values to a computer;

computing from the measured values and from relative transverse positions of the radiation sensors to one another a local structural image of the at least one measuring location of the web, wherein the measured values are transformed into a sensor matrix of pixels based on a matrix arrangement of the sensors and a structural image of line formation is built from the measured values positioned adjacent to one another, and wherein a deviation of an alignment of line formations of the structural image of the web from a nominal structural image is determined.

2. The method according to claim 1, wherein in the step of computing the computer determines the transverse positions of the radiation source and the detector, based on a traversing speed of the radiation source and the detector, and correlates the local structural image at each measuring location to the determined transverse position.

3. The method according to claim 1, wherein during the step of reciprocating in a first direction several spaced apart first measuring locations of the web are irradiated and measured and wherein in a second return direction several spaced apart second measuring locations of the web are irradiated and measured, wherein the several spaced apart second measuring locations of the web are located between the several spaced apart first measuring locations of the web.

4. The method according to claim 1, wherein the traversing path of the radiation source and of the detector and the traversing speed are adjusted by the computer according to determined deviations of the structural alignment from the nominal values.

5. A method for determining alignment of line formations of a web, said method comprising the steps of:
   providing a radiation source emitting radiation and a detector with numerous radiation sensors for sensing the radiation;
   reciprocating the radiation source and the detector together simultaneously transversely across a web;
   during the step of reciprocating, irradiating at least one measuring location of the web by the radiation source and measuring measured values, based on local radiation intensities of the at least one measuring location of the web, by the radiation sensors of the detector;
   communicating the measured values to a computer;
   computing from the measured values and from relative transverse positions of the radiation sensors to one another a local structural image of the at least one measuring location of the web, wherein the measured values are transformed into a sensor matrix based on a matrix arrangement of the sensors and a deviation of an alignment of line formations of the local structural image from a nominal structural image is determined;
   wherein, for determining the alignment of the line formations of the local structural image with a nominal structural image having straight structures, a virtual reference grid, comprised of straight parallel lines, is projected onto the sensor matrix and the measured values along each straight parallel line of the reference grid are added, and subsequently, the reference grid is rotated by predetermined angular steps relative to the sensor matrix and additional summation processes of the measured values along the straight lines are performed for each angular step, wherein extremes of the summations along the straight parallel lines of the respective angular steps are determined and the angular step of the determined extreme is assigned to the alignment of the structural image.

6. The method according to claim 5, wherein the angular steps of the rotation of the virtual reference grid are more finely spaced in areas where structural alignment is to be expected in the examined portion of the web than in areas of greater deviation.

7. The method according to claim 6, wherein the angular steps are varied between 0.1 and 1.5° within a predetermined angular range of the nominal alignment and 0.5 to 3° outside of the predetermined angular range of the nominal alignment.

8. The method according to claim 5, wherein, when several extremes have been determined, the extreme corresponding to the yarn orientation is determined by using the absolute amounts of differences between the summations and/or the geometric spacing between the extremes.

* * * * *